US010754226B2

(12) United States Patent
Iwato et al.

(10) Patent No.: US 10,754,226 B2
(45) Date of Patent: Aug. 25, 2020

(54) BLADE DRIVE DEVICE (71) Applicant: NIDEC COPAL CORPORATION, Tokyo (JP)

(72) Inventors: Shozo Iwato, Tokyo (JP); Koji Sawanobori, Tokyo (JP); Kazuo Shikama, Tokyo (JP); Kenzo Imai, Tokyo (JP); Nobuaki Watanabe, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 0 days.

(21) Appl. No.: 16/471,208

(22) PCT Filed: Nov. 24, 2017

(86) PCT No.: PCT/JP2017/042265
§ 371 (c)(1),
(2) Date: Jun. 19, 2019

(87) PCT Pub. No.: WO2018/116744
PCT Pub. Date: Jun. 28, 2018

(65) Prior Publication Data
US 2020/0089081 A1 Mar. 19, 2020

(30) Foreign Application Priority Data
Dec. 20, 2016 (JP) .................. 2019-246162

(51) Int. Cl.
*G03B 9/36* (2006.01)
(52) U.S. Cl.
CPC .................. *G03B 9/36* (2013.01)

(58) Field of Classification Search
USPC ......................................... 396/489
See application file for complete search history.

(56) References Cited

U.S. PATENT DOCUMENTS

| 8,449,206 | B2* | 5/2013 | Takahashi | G03B 9/18 |
|||||396/456|
| 2010/0197372 | A1* | 8/2010 | Takagi | H04M 1/0237 |
|||||455/575.4|

(Continued)

FOREIGN PATENT DOCUMENTS

| JP | 2004-348030 A | 12/2004 |
| JP | 2005-62315 A | 3/2005 |

(Continued)

OTHER PUBLICATIONS

International Search Report issued in corresponding International Patent Application No. PCT/JP2017/042265 dated Feb. 6, 2018.

*Primary Examiner* — Clayton E. LaBalle
*Assistant Examiner* — Warren K Fenwick
(74) *Attorney, Agent, or Firm* — Troutman Pepper Hamilton Sanders LLP (57) ABSTRACT

A blade driving device comprising: a driving member; one or more blade members that are caused to undergo sliding motion by the driving member; a blade supporting unit for supporting the blade member slidably; and a frame for containing the driving member and a portion of the blade supporting unit, wherein the blade supporting unit comprises a blade chamber for containing a blade member between opposing thin plate members, along with an insertion portion that has an opening and that protrudes from a frame, wherein the opposing thin plate members are integrated together at least the tip end of the insertion portion.

8 Claims, 11 Drawing Sheets

(56) References Cited

U.S. PATENT DOCUMENTS

| | | | |
|---|---|---|---|
| 2015/0234257 A1* | 8/2015 | Takahashi | G03B 9/42 396/489 |
| 2016/0077405 A1* | 3/2016 | Nakano | G03B 9/40 396/489 |
| 2020/0089081 A1* | 3/2020 | Iwato | G03B 9/00 |

FOREIGN PATENT DOCUMENTS

| | | |
|---|---|---|
| JP | 2005-91549 A | 4/2005 |
| JP | 2005-173133 A | 6/2005 |
| JP | 2006-301290 A | 11/2006 |
| JP | 2007-271670 A | 10/2007 |
| JP | 2008-250096 A | 10/2008 |
| JP | 2014-71317 A | 4/2014 |

* cited by examiner

BLADE DRIVE DEVICE

CROSS-REFERENCE TO RELATED APPLICATIONS

This application is a National Stage of International Application PCT/JP2017/042265 filed Nov. 24, 2017 and published as WO 2018/116744 Jun. 28, 2018 and claims priority to Japanese Application No. 2016-246162 dated Dec. 20, 2016. These applications are incorporated herein by reference.

FIELD OF TECHNOLOGY

The present invention relates to a blade driving device used in an imaging device, or the like.

BACKGROUND

Blade driving devices are used to change the state of an opening by driving one or more blade members that advance into the opening, and are used in a variety up optical units, such as cameras, for irises, shutters, iris-shutters, filters, and the like.

Typically the blade driving device is disposed overlapping the lens frame, but a blade driving device that is assembled into the interior of a lens frame, in order to achieve miniaturization or integration, is also known. In such a conventional technology, the blade driving device comprises an insertion portion that has an opening, where the insertion portion is inserted into a slit that is provided in an outer lens barrel of the lens frame (see, Japanese Unexamined Patent Application Publication 2007-271670.

SUMMARY

Because the spacing between lenses in a lens frame is narrow, in a blade driving device equipped in a small optical unit it is difficult to insert the insertion portion of the blade driving device between lenses without contacting a lens.

The present invention is proposed in order to handle problems such as these. That is, the object is, for example, to prevent contact with the lens when inserting the opening and blade of a blade driving device into a narrow gap between lenses.

In order to solve such a problem, the lens driving device according to the present invention is provided with the following structures:

A blade driving device, with a driving member; one or more blade members that are caused to undergo sliding motion by the driving member; a blade supporting unit for supporting the blade member slidably; and a frame for containing the driving member and a portion of the blade supporting unit, wherein: the blade supporting unit comprises a blade chamber for containing a blade member between opposing thin plate members, along with an insertion portion that has an opening and that protrudes from a frame, wherein the opposing thin plate members are integrated together at at least the tip end of the insertion portion.

DETAILED DESCRIPTION

Embodiments according to the present invention will be explained below in reference to the drawings. In the descriptions below, identical reference symbols in the different drawings below indicate positions with identical functions, and redundant explanations in the various drawings are omitted as appropriate. In the figure, the arrow in the Z direction indicates the optical axial direction (the thickness direction of the blade driving device; the arrow X indicates the direction of movement of the blade member; and the direction of the arrow Y indicates a direction that is perpendicular to the X and Z directions.

Figure 1:
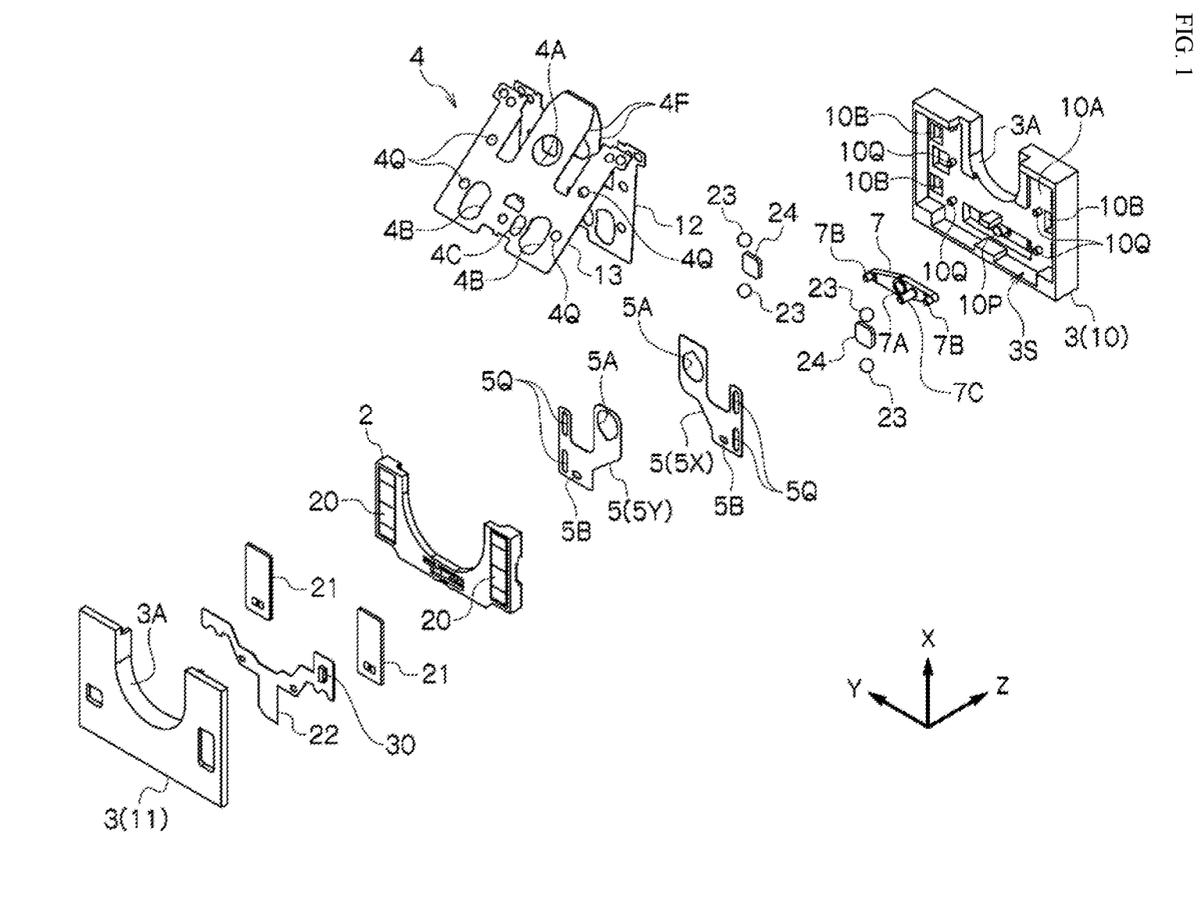
FIG. 1 is a perspective assembly diagram of a blade driving device according to an embodiment according to the present invention.

As illustrated in FIG. 1, a blade driving device 1 in an embodiment according to the present invention comprises a driving member 2, a frame 3, a blade supporting unit 4, and blade members 5 (5X and 5Y). The frame 3 is structured from a base frame 10 and a cover frame 11 that covers the base frame 10, to form a driving frame chamber 3S that contains the driving member 2 therein. The driving member 2 is supported movably on a supporting face 10A of the base frame 10, so as to move the blade members 5 (5X and 5Y) through moving on a plane. The example in the figure, the blade member 5 is a plurality of blades (2 blades), but it may instead be of a single blade.

A magnet 20 and a coil 21, which are the driving source, are attached to the driving member 2 and the frame 3. In the example in FIG. 1, the magnet 20 is attached to the driving member 2 and the coil 21 is attached to the frame 3 (the cover frame 11), where power is applied to the coil 21 through a wiring board (a flexible substrate) 22, to cause the driving member 2 to undergo reciprocating motion in the X direction in the figure. The driving member 2 is supported movably in a supporting groove 10B of a supporting face 10A on a bearing 23. Moreover, a Hall element (detecting member) 30, for detecting movement of the driving member 2 or the blade member 5 (5X, 5Y) is disposed on the wiring board 22 at a position corresponding to the magnet 20.

The blade members 5 (5X, 5Y) are connected to the driving member 2, either directly or through connecting members 7. In the example depicted in FIG. 1, the connecting member 7 is borne within the frame 3. In the connecting member 7, a bearing portion 7A, in the center, is borne on a shaft 10P of the base frame 10, where connecting portions 7B, on both ends thereof, pass through elongated holes 4B of the blade supporting unit 4, and are respectively connected in connecting holes 5B of the blade members 5X and 5Y, where, near the center, the connecting portion 7C passes through an elongated hole 4C of the blade supporting unit 4, and is connected to the driving member 2. Through this, when the driving member 2 undergoes reciprocating motion linearly along the X direction, the connecting member 7 rotates around the shaft 10P, so that the blade members 5X and 5Y, which are connected to the connecting portions 7B, move in mutually opposing directions along the X direction.

The blade member 5 (5X, 5Y) is supported on a blade supporting unit 4. The blade supporting unit 4 is structured from opposing thin plate members 12 and 13, made from thin metal plates, or the like. The opposing thin plate members 12 and 13 form a blade chamber for containing the blade member 5 (5X, 5Y) in the interior thereof. The blade supporting unit 4 has an opening 4A. The blade member 5 (5X, 5Y) is slid, by the driving member 2, to advance into the opening 4A. In the example in the figure, the blade member 5 (5X, 5Y) has an opening 5A, where the degree of overlap of the opening 5A in the opening 4A is adjusted variably by the movement in the X direction in the figure.

In FIG. 1, a protrusion 10Q of the base frame 10 fits into a hole 4Q of the blade supporting unit 4, to engage the blade supporting unit 4 with the base frame 10, and, additionally, the protrusion 10Q is inserted into a guide hole (elongated hole) 5Q of the blade member 5 (5X, 5Y) that is supported on the blade supporting unit 4, to guide the movement of the blade member 5 (5X, 5Y). Moreover, within the frame 3 (the base frame 10), a magnetic material 24 is disposed to hold the blade member 5 in an initial position, and to attract the driving member 2 in the optical axial direction relative to the base frame 10.

Figure 2:
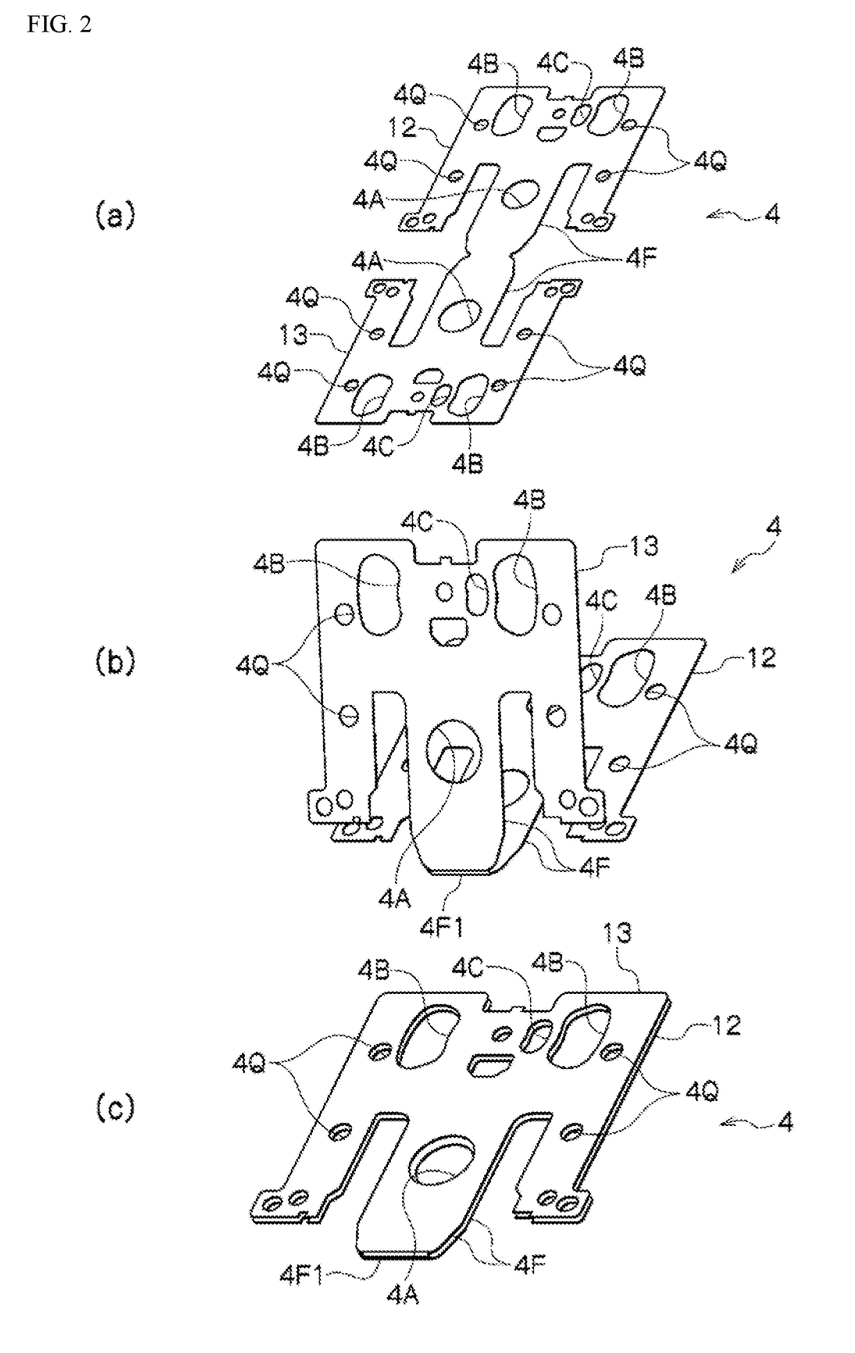
FIG. 2 is an explanatory diagram depicting an example of forming a blade supporting unit (where (a) through (c) depict processing steps).

The blade supporting unit 4 comprises an insertion portion 4F that protrudes from a frame 3. The insertion portion 4F has an opening 4A, referenced above. Additionally, thin plate members 12 and 13, which structure the blade supporting unit 4, are joined together at a tip end of the insertion portion 4F. As depicted in FIG. 2 (a), the thin plate members 12 and 13 can be processed from a single sheet, where, as depicted in FIG. 2 (b), they are folded back at a fold-back portion 4F1 at the tip end of the insertion portion 4F, to cause the thin plate members 12 and 13 to oppose each other, as depicted in FIG. 2 (c), to form the blade chamber therebetween.

Figure 3:
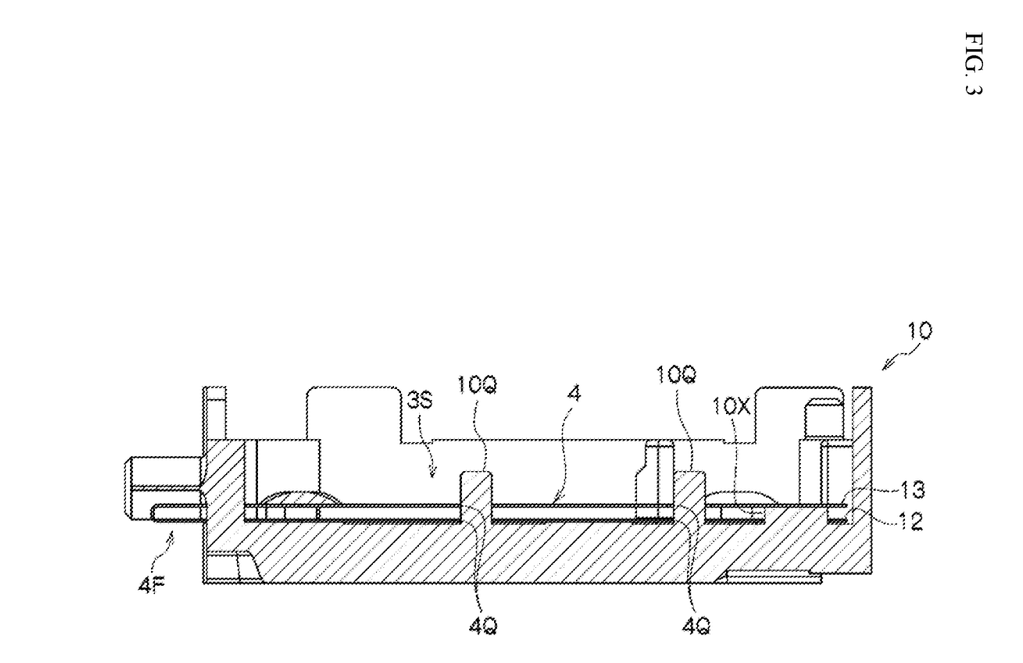
FIG. 3 is an explanatory diagram depicting an example of a cross-section of a blade supporting unit.

Moreover, as illustrated in FIG. 3, the base frame 10 is formed so as to bear the outside face of the thin plate member 12, and the tip end of the insertion portion 4F is bent back, and the inside face of the thin plate member 13 is borne by a supporting portion 10X, so that the blade chamber is formed with an appropriate gap. Forming the blade chamber in this way makes the blade chamber resistant to deformation through, for example, a drop impact.

Through providing such a blade supporting unit 4, the blade member 5 slides within the thin blade chamber, and thus this can prevent the blade member 5 from contacting the lens when the insertion portion 4F is inserted between lenses and causes the blade member 5 to slide. Moreover, because the tip end of the insertion portion 4F is a single unit, this makes it possible to prevent the tip end of the insertion portion 4F from opening up and scratching the lenses when the insertion portion 4F is inserted between the lenses.

Note that while, in the embodiment, the blade supporting unit 4 used a PET film, as another example it may instead use a metal such as aluminum, or the like, or may use another material.

Figure 4:
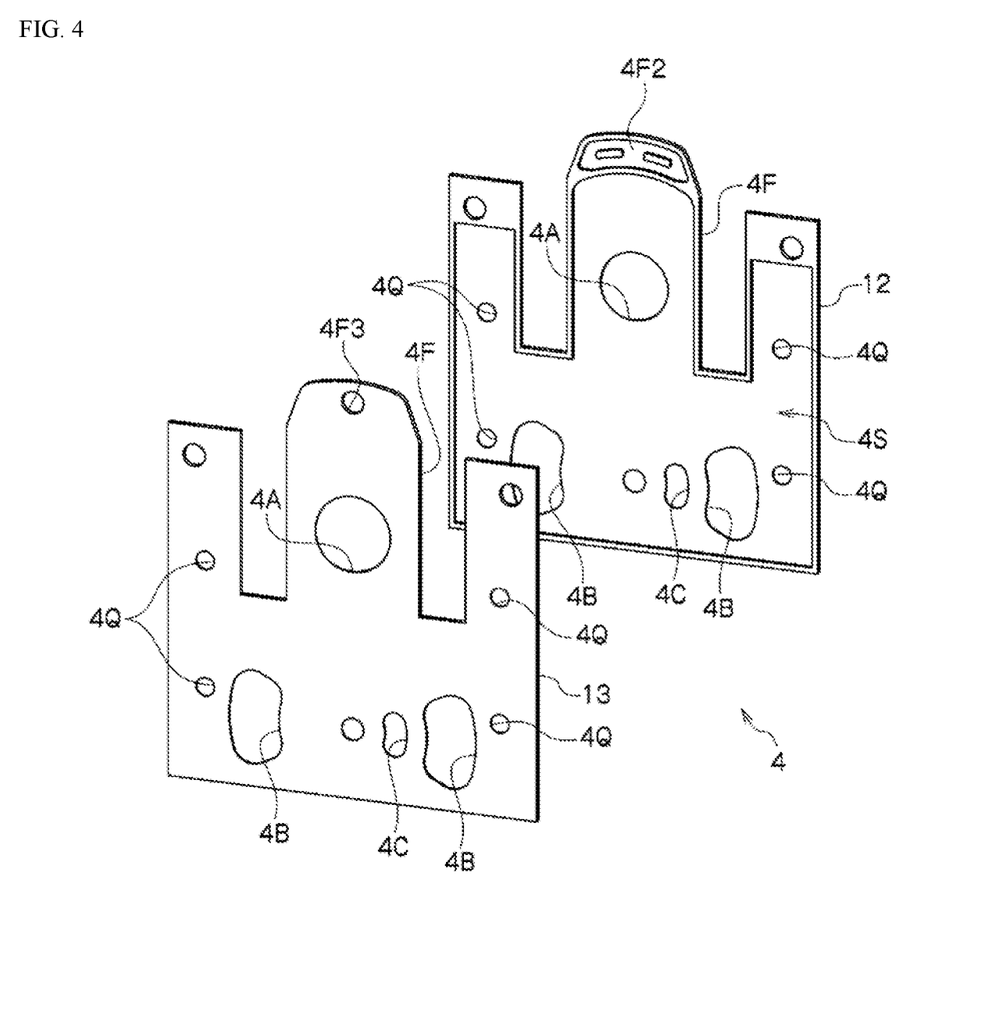
FIG. 4 is an explanatory diagram depicting another example configuration of a blade supporting unit.

FIG. 4 depicts another structural example of a blade supporting unit 4. In this example, the tip end portion of the insertion portion 4F is joined together into a single unit by joining together using an adhesive agent. An adhesive agent reservoir 4F2 is provided on one thin plate member 12 side at the tip end portion of the insertion portion 4F, and an adhesive agent filling hole 4F3 is provided on the other thin plate member 13 side. This makes it possible to prevent the tip end of the insertion portion 4F from opening and scratching the lenses when the insertion portion 4F is inserted between the lenses, as described above.

Moreover, in the example in the figure, a stepped portion is formed on an outer edge of the thin plate member 12, to form a thin blade chamber 4S on the inside thereof. Such a stepped portion may be formed through bend machining of the outer edge, or may be formed through half-etching the thin plate member 12.

Figure 5:
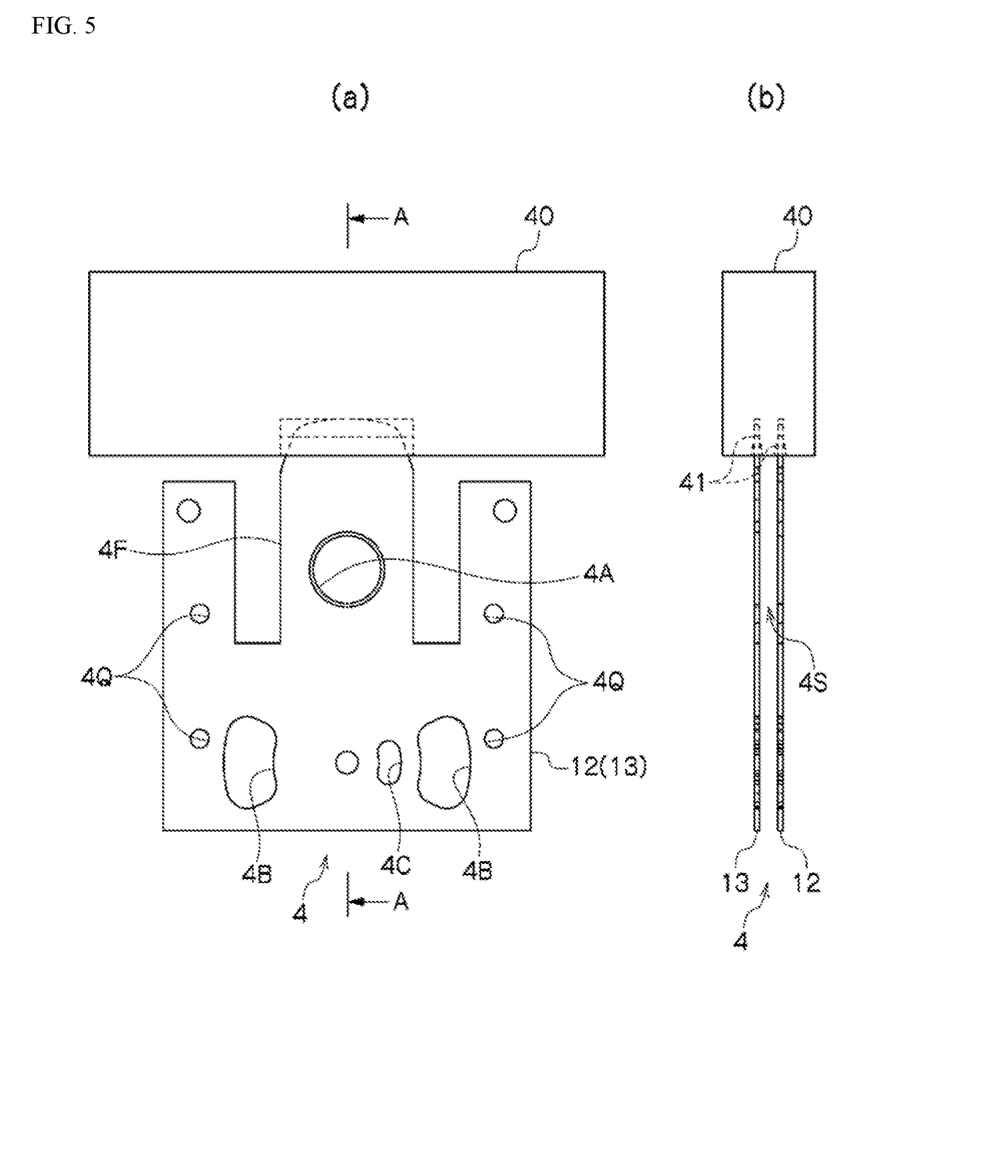
FIG. 5 is an explanatory diagram depicting another structural example of a blade supporting unit (wherein (a) is a plan view and (b) is a cross-sectional drawing for the section A-A).

FIG. 5 depicts another structural example of a blade supporting unit 4. In this example, the tip end portion of the insertion portion 4F is supported by a spacer 40. Engaging grooves 41 are formed in the spacer 40, and the tip ends of the insertion portion 4F are inserted into, and supported by, these engaging grooves 41. In this example, the spacer 40 is disposed between the opposing thin plate members 12 and 13, and the thin blade chamber 4S is formed therebetween.

Figure 6:
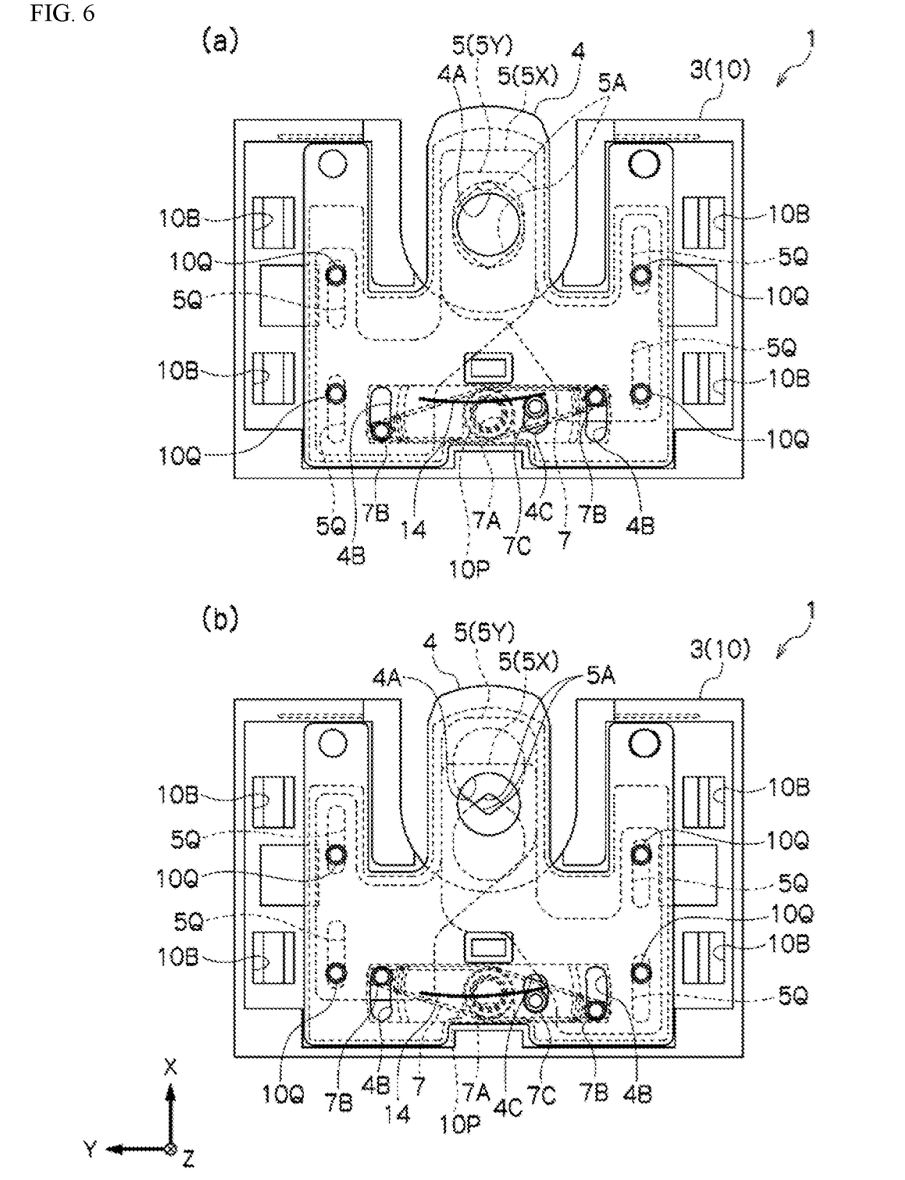
FIG. 6 is an explanatory diagram depicting the movement of the blade member (wherein (a) shows the fully opened state and (b) shows the closed state).

FIG. 6 depicts the movement of the blade member 5 (5X, 5Y). In the example in the figure, an example is shown wherein the blade driving device 1 has the function of an iris device for variably adjusting the brightness of light that passes through the opening 4A. (a) depicts the fully open state of the opening 4A through the rotation of the connecting member 7 by the movement of the driving member 2 (not shown), described above, and (b) depicts the state wherein the opening area is closed through overlapping of the opening 5A within the opening 4A. While, in the example in the figure, an example of an iris device is depicted, the blade driving device 1 may instead function as a shutter device for blocking the light that passes through the opening 4A by fully closing the opening 4A by the blade members 5 (5X and 5Y) overlapping, or may function as a filter device through attaching a filter, for limiting the wavelengths or brightness of the light, to end portions of the openings 5A of the blade members 5 (5X and 5Y).

Note that in the example depicted in FIG. 6, in the connecting portion between the driving member 2, not shown, and the connecting member 7, one end is secured to the driving member 2, and the other end is provided with an elastic member (a leaf spring) 14 that presses the connecting portion 7C of the connecting member 7. Through connecting the driving member 2 and the connecting member 7 through the elastic member 14 in this way, the movement of the driving member 2 can be transmitted to the connecting member 7 without rattling, making it possible to increase the accuracy of movement of the blade members 5 (5X and 5Y), enabling an increase in the accuracy of brightness adjustment.

Figure 7:
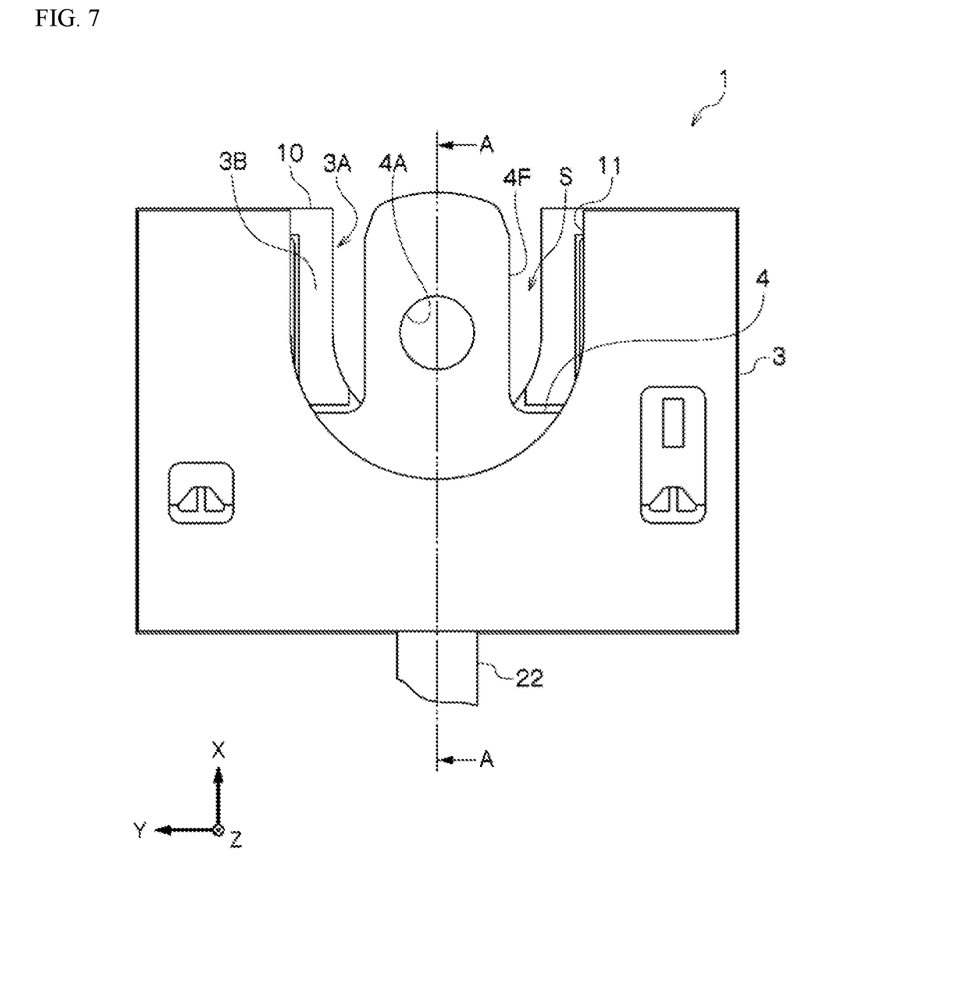
FIG. 7 is an external view (plan view) of a blade driving device according to an embodiment according to the present invention.
Figure 8:
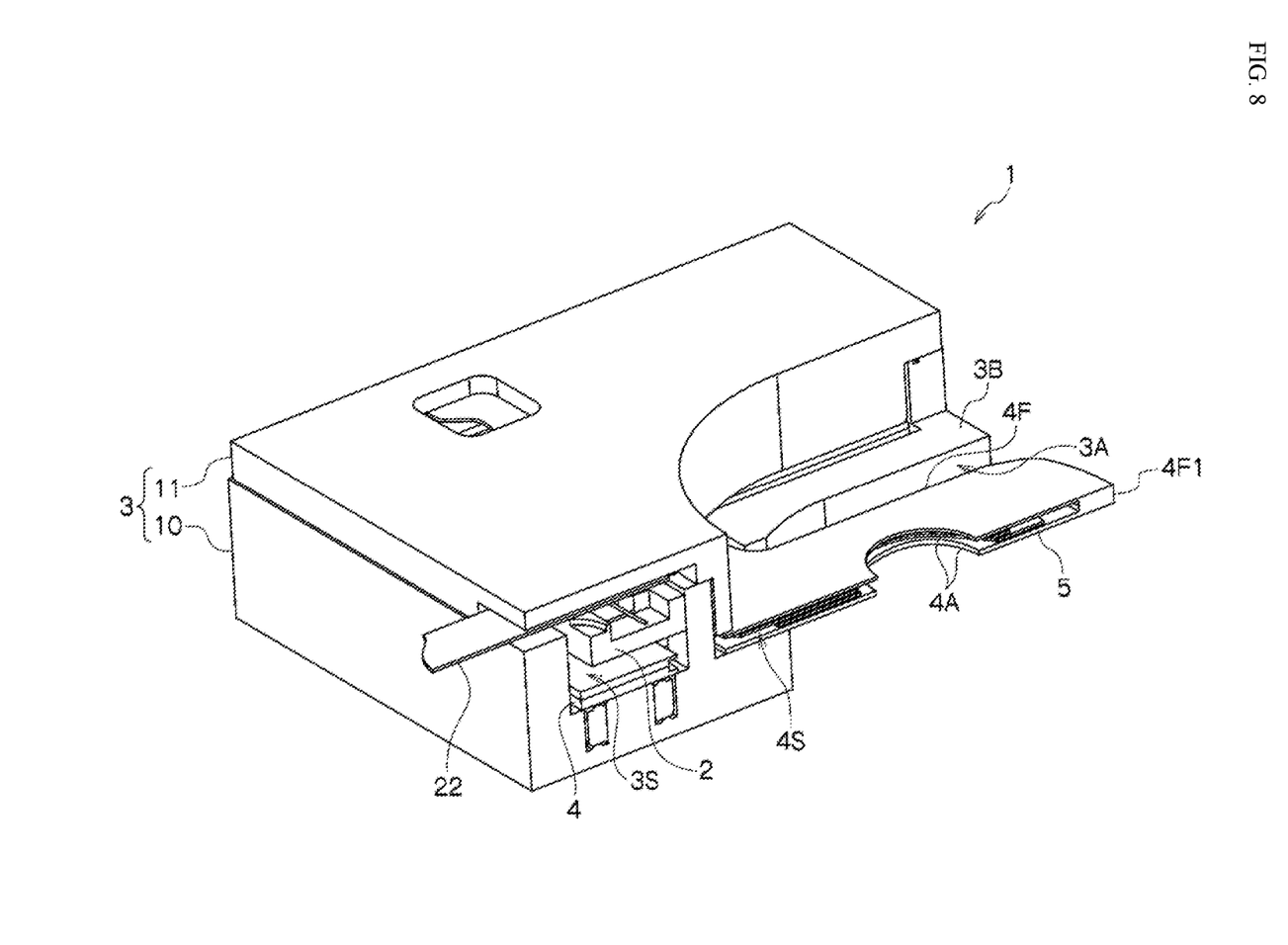
FIG. 8 is a perspective diagram of the A-A cross-section in FIG. 7.

FIG. 7 depicts an external view of the blade driving device 1, and FIG. 8 depicts a perspective diagram along the cross-section A-A in FIG. 7. In the blade driving device 1, an insertion portion 4F of a blade supporting unit 4 for containing the blade member 5 protrudes toward the outside, in the direction of movement of the driving member 2 (the X direction in the figure), from a portion of the thickness of the frame 3, between the base frame 10 and the cover frame 11. Through this, the opening 4A of the blade supporting unit 4 is positioned outside of the frame 3. The blade supporting unit 4 is a member of a thin shape, structured so as to be thinner than the thickness of the frame 3.

In relation to this, the outer peripheral edge of the frame 3 has a recessed portion 3A at the position wherein the blade supporting unit 4 protrudes. Through this, the insertion portion 4F and opening 4A of the blade supporting unit 4 are located within a space that is outside of the frame 3, because of the recessed portion 3A. Moreover, a stepped portion 3B for supporting the content, by the frame 3, is provided in the recessed portion 3A of the frame 3. Given this, a gap S is formed between the insertion portion 4F of the blade supporting unit 4 that protrudes in the recessed portion 3A, and the outer periphery of the recessed portion 3A of the frame 3.

Given the blade driving device 1 of this type, the insertion portion 4F of the thin blade supporting unit 4 protrudes the outside, from a portion of the frame 3, in the thickness direction thereof, and an opening 4A is provided in this insertion portion 4F, and thus the insertion portion 4F enables the opening 4A to be disposed on the optical axis of the lens, through insertion of the insertion portion 4F from the outside in respect to the lens frame. Through this, this makes it possible to avoid the lens frame and the blade driving device 1 being disposed stacked in the optical axial direction, enabling the combination of the lens frame and the blade driving device 1 to be structured more thinly.

Additionally, a gap S is provided between the insertion portion 4F of the blade supporting unit 4 and the outer periphery of the recessed portion 3A of the frame 3, and insertion portion 4F protrudes in a cantilevered state, thus enabling insertion of the insertion portion 4F from the side of a portion of the lens frame, enabling the opening 4A to be disposed on the optical axis. This enables the blade driving device 1 to be built into the single-unit lens frame after adjustments of the lens spacing, and the like, of the lens frame have been completed, simplifying the adjustments to the lens frame into which the blade driving device 1 will be assembled. Note that, conversely, the adjustments to the lens frame may be performed after assembly together with the blade driving device 1.

Figure 9:
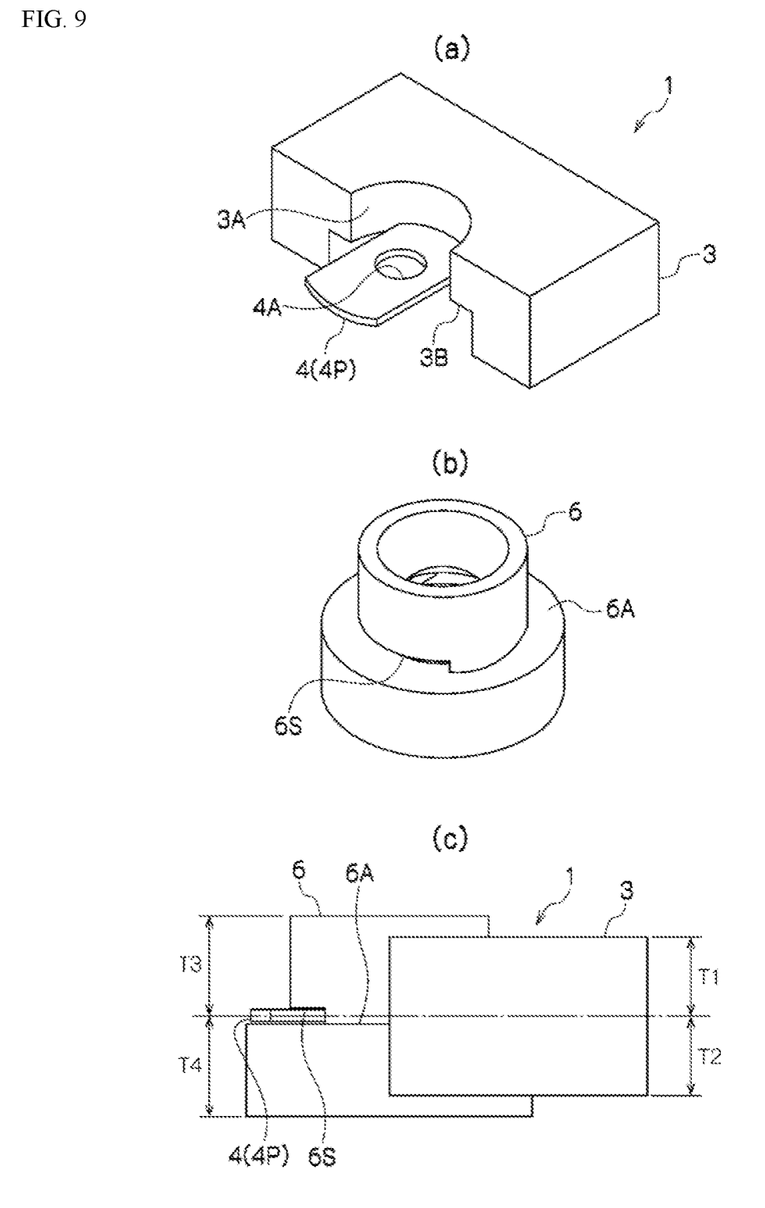
FIG. 9 is an explanatory diagram depicting an example of assembling of the blade driving device to the lens frame (wherein (a) is the blade driving device alone, (b) is the lens frame alone, and (c) is the assembled state).

FIG. 9 depicts an example of assembling the blade driving device 1 together with the lens frame 6. The thickness (T1+T2) of the blade driving device 1 (frame 3) is thinner than the thickness (T3+T4) of the lens frame 6, and in the assembly, the thickness of the blade driving device 1 is contained within the thickness of the lens frame 6. However, the blade driving device 1 need not necessarily be contained within the thickness of the lens frame 6. For example, the assembly may be with a portion, or one surface, of the blade driving device 1 extending outward relative to one side of the lens frame 6.

In the example in the figure, the protruding portion of the blade supporting unit 4 is at the center portion of the thickness of the frame 3. In addition, in the lens frame 6, the length (T4) on the front side, along the optical axial direction, and the length (T3) on the back side, in relation to the position of the slit 6S into which the blade supporting unit 4 is inserted, are equal. There is no limitation thereto, but rather the position of the slit 6S may be set arbitrarily as appropriate.

Figure 10:
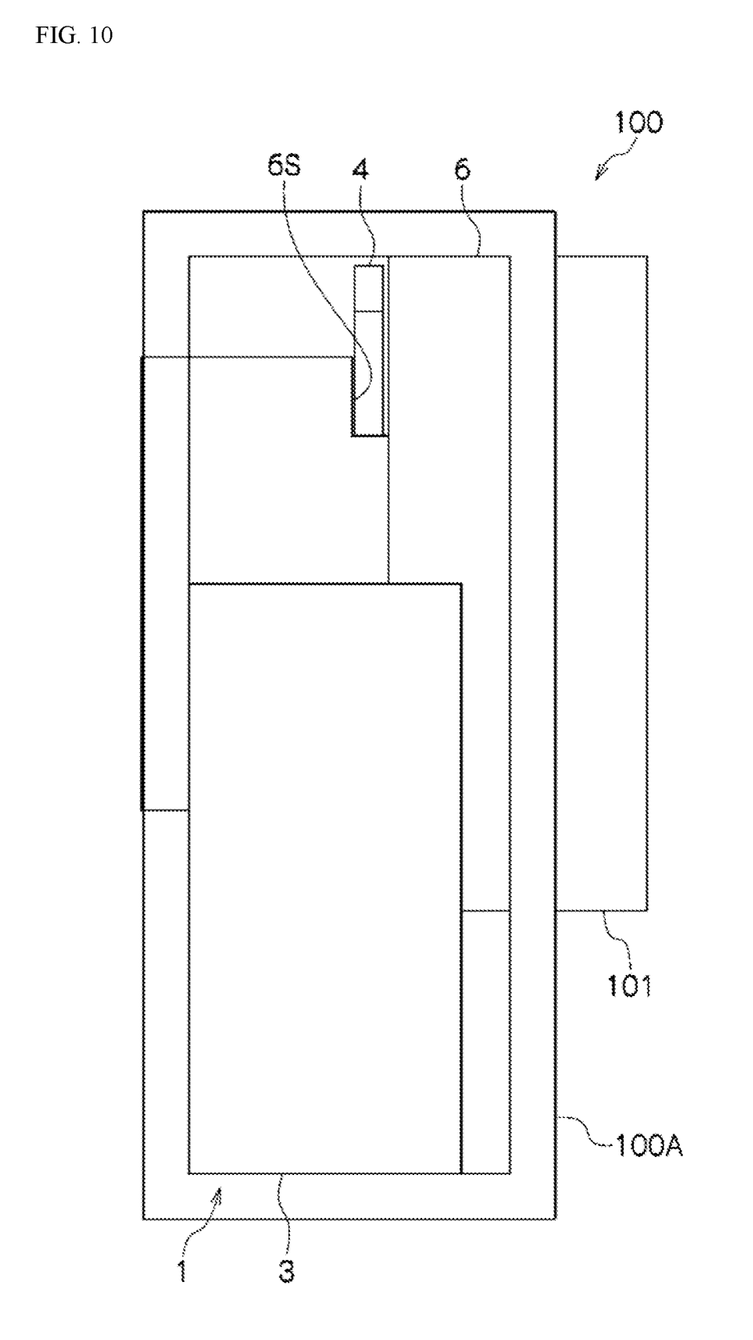
FIG. 10 is an explanatory diagram depicting a camera equipped with the blade driving device.

FIG. 10 depicts a camera 100 as an optical unit that is provided with the blade driving device 1. The blade driving device 1 may be assembled together with the lens frame 6 as described above, and may be mounted in a case 100A wherein an imaging element 101 is mounted, to structure a camera 100. Moreover, various types of optical units can be produced through assembling the blade driving device 1 together with other optical components. Such a camera 100 or optical unit can be made thinner, enabling a reduction in the thickness of the space for installation along the optical axial direction. Moreover, because the blade driving device 1 can be assembled and integrated after the adjustments to the lens frame 6, and the like, have been completed, this enables simple and highly accurate adjustments, and enables simple mounting through integration of the blade driving device 1.

Figure 11:
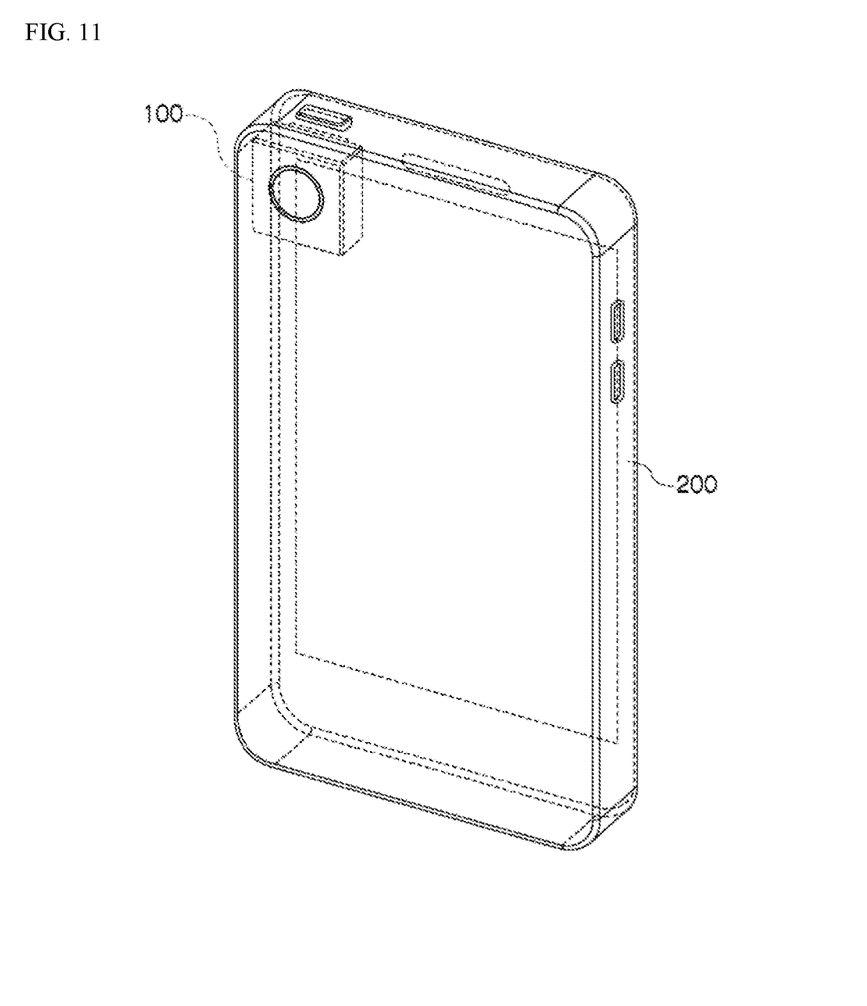
FIG. 11 is an explanatory diagram depicting a mobile electronic device equipped with the blade driving device (camera).

FIG. 11 depicts a mobile electronic device (mobile information terminal) 200 that is equipped with the camera 100 described above. The mobile electronic device 200, such as a smart phone, or the like, has severe limitations on the thickness of the units packaged in the interior thereof, but the camera 100, as described above, enables a reduction in thickness through assembly with the blade driving device 1 contained within the thickness of the lens frame 6, thus enabling packaging with excellent spatial efficiency in a mobile electronic device 200 that targets high portability and design characteristics. Note that the members disposed within the frame 3 in these examples have the layout positions and shapes designed so as to be assembled sequentially from one side of the base frame 10.

While embodiments according to the present invention were described in detail above, referencing the drawings, the specific structures thereof are not limited to these embodiments, but rather design variations within a range that does not deviate from the spirit and intent of the present invention are also included in the present invention. In particular, while in the embodiments set forth above, the frame 3 of the blade driving device 1 was structured from a member that was separate from the blade supporting unit 4, instead the frame 3 may be structured integrally with the blade supporting unit 4, and the driving frame chamber 3S within the frame 3 and the blade chamber 4S within the blade supporting unit 4 may be separated through a partition. Moreover, insofar as there are no particular contradictions or problems in purposes or structures, or the like, the technologies of the various embodiments described above may be used together in combination.

The invention claimed is:

1. A blade driving device, comprising:
   a driving member;
   one or more blade members that to undergo sliding motion by the driving member;
   a blade supporting unit supporting the blade member slidably; and
   a frame containing the driving member and a portion of the blade supporting unit, wherein:
   the blade supporting unit comprises a blade chamber for containing a blade member between opposing thin plate members, along with an insertion portion that comprises an opening and that protrudes from a frame,
   wherein the opposing thin plate members are integrated together at least at a tip end of the insertion portion.

2. The blade driving device as set forth in claim 1, comprising:
   an adhesive agent reservoir provided at a tip end portion of the insertion portion.

3. The blade driving device as set forth in claim 1, wherein:

the opposing thin plate members are folded back at a tip end of the insertion portion.

4. The blade driving device as set forth in claim 1, wherein:
the blade chamber is formed by bending an outer edge of the thin plate member.

5. The blade driving device as set forth in claim 1, wherein:
the blade chamber is formed through half-etching the thin plate member.

6. The blade driving device as set forth in claim 1, wherein:
the blade chamber is formed through a spacer that is disposed between the opposing thin plate members.

7. A camera provided with a blade driving device as set forth in claim 1.

8. A mobile electronic device comprising a camera as set forth in claim 7.

\* \* \* \* \*